(12) United States Patent
Nikitina et al.

(10) Patent No.: US 10,042,879 B1
(45) Date of Patent: Aug. 7, 2018

(54) TECHNIQUES FOR DYNAMICALLY ENRICHING AND PROPAGATING A CORRELATION CONTEXT

(71) Applicant: LendingClub Corporation, San Francisco, CA (US)

(72) Inventors: Yana Nikitina, San Francisco, CA (US); Igor Petrunya, Pleasant Hill, CA (US); Fernando Lores, Oakland, CA (US)

(73) Assignee: LENDINGCLUB CORPORATION, San Francisco, CA (US)

( * ) Notice: Subject to any disclaimer, the term of this patent is extended or adjusted under 35 U.S.C. 154(b) by 0 days.

(21) Appl. No.: 15/833,952

(22) Filed: Dec. 6, 2017

Related U.S. Application Data

(60) Provisional application No. 62/585,499, filed on Nov. 13, 2017.

(51) Int. Cl.
| | |
|---|---|
| *G06F 17/30* | (2006.01) |
| *G06F 21/44* | (2013.01) |
| *G06F 9/54* | (2006.01) |
| *G06N 99/00* | (2010.01) |

(52) U.S. Cl.
CPC ........ *G06F 17/30371* (2013.01); *G06F 9/547* (2013.01); *G06F 17/30309* (2013.01); *G06F 17/30351* (2013.01); *G06F 21/44* (2013.01); *G06N 99/005* (2013.01)

(58) Field of Classification Search
CPC ........ G06F 17/30309; G06F 17/30371; G06F 17/30351; G06F 21/44; G06F 9/547; G06F 9/485; G06F 9/466; G06F 17/30194; G06F 9/463; G06F 9/5027; G06F 17/30575; G06F 17/30569; G06F 9/50; G06N 99/005
See application file for complete search history.

(56) References Cited

U.S. PATENT DOCUMENTS

| | | | | |
|---|---|---|---|---|
| 5,694,546 | A | * 12/1997 | Reisman | ......... G06F 8/65 |
| | | | | 705/27.1 |
| 6,662,199 | B1 | * 12/2003 | Flight | ......... G06Q 10/06 |
| | | | | 707/694 |

(Continued)

OTHER PUBLICATIONS

Nikitina, U.S. Appl. No. 15/833,943, filed Dec. 6, 2017, Office Action, dated Feb. 23, 2018.

*Primary Examiner* — Anh Ly
(74) *Attorney, Agent, or Firm* — Hickman Palermo Becker Bingham LLP

(57) ABSTRACT

Techniques a provided for performing multi-system operations in which changes are asynchronously committed in multiple systems. Metadata about the multi-system operation is injected into the commit logs of one system involved in a multi-system operation. An event stream is generated based on the commit logs of the one system, and is used to drive the operations that one or more other systems need to perform as part of the multi-system operation. A reconciliation system reads the logs of all systems involved in the multi-system operation and determines whether the multi-system operation completed successfully. Techniques are also provided for using machine learning to generate models of normal execution of different types of operations, detect anomalies, pre-emptively send expectation messages, and automatically suggest and/or apply fixes.

28 Claims, 9 Drawing Sheets

(56) References Cited

U.S. PATENT DOCUMENTS

| | | | |
|---|---|---|---|
| 6,769,009 B1* | 7/2004 | Reisman | G06F 8/65 |
| | | | 705/27.1 |
| 8,078,639 B2 | 12/2011 | Christiansen | |
| 9,424,140 B1 | 8/2016 | Madhavarapu | |
| 9,659,026 B2 | 5/2017 | Leverett | |
| 2010/0016879 A1 | 8/2001 | Sekiguchi | |
| 2004/0255201 A1 | 12/2004 | Liu | |
| 2009/0077135 A1* | 3/2009 | Yalamanchi | G06F 17/30359 |
| | | | 707/E17.005 |
| 2011/0016085 A1 | 1/2011 | Kuo | |
| 2011/0276611 A1 | 11/2011 | Verma | |
| 2013/0157638 A1* | 6/2013 | Malmbak | H04W 4/001 |
| | | | 455/418 |
| 2013/0185750 A1* | 7/2013 | Ayoub | H04N 21/25841 |
| | | | 725/34 |
| 2013/0290249 A1* | 10/2013 | Merriman | G06F 17/30578 |
| | | | 707/610 |
| 2013/0235830 A1 | 12/2013 | Verma | |
| 2014/0074764 A1* | 3/2014 | Duftler | G06N 5/025 |
| | | | 706/47 |
| 2014/0189216 A1 | 7/2014 | Flynn | |
| 2014/0279930 A1* | 9/2014 | Gupta | G06F 11/1464 |
| | | | 707/683 |
| 2014/0279931 A1* | 9/2014 | Gupta | G06F 17/30575 |
| | | | 707/683 |
| 2015/0169288 A1* | 6/2015 | Yamamoto | G06F 11/3075 |
| | | | 707/752 |
| 2016/0006837 A1 | 1/2016 | Reynolds | |
| 2016/0057507 A1 | 2/2016 | McKenna | |
| 2016/0080425 A1* | 3/2016 | Cianfrocca | H04L 63/0227 |
| | | | 726/1 |
| 2016/0308769 A1 | 10/2016 | VerSteeg | |
| 2016/0366534 A1* | 12/2016 | Griesmann | H04W 4/005 |
| | | | 707/E17.009 |
| 2017/0177658 A1* | 6/2017 | Lee | G06F 11/1451 |
| | | | 707/E17.045 |
| 2017/0270176 A1* | 9/2017 | Horowitz | G06F 17/30371 |
| | | | 707/E17.45 |
| 2017/0315882 A1 | 11/2017 | Yammine | |
| 2018/0150496 A1* | 5/2018 | Kim | G06F 17/30353 |
| | | | 707/E17.004 |

* cited by examiner

TECHNIQUES FOR DYNAMICALLY ENRICHING AND PROPAGATING A CORRELATION CONTEXT

CROSS-REFERENCE TO RELATED APPLICATIONS; BENEFIT CLAIM

This application claims the benefit of Provisional Appln. 62/585,499, filed Nov. 13, 2017, the entire contents of which is hereby incorporated by reference as if fully set forth herein, under 35 U.S.C. § 119(e).

FIELD OF THE INVENTION

The present invention relates to performing operations involving multiple computer systems and, more specifically, monitoring and verifying consistency of operations involving multiple computer systems.

BACKGROUND

Many real-world computer-implemented operations involve making changes in multiple computer systems. Such operations are referred to herein as "multi-system operations". For example, the online purchase of an airline ticket may involve adjusting seat availability in an airline's database system, as well as adjusting account balance in one or more bank database systems. Since the changes made by multi-system operations are logically all part of the same high-level operation, it is preferable that either all of the changes be made permanent, or that none of the changes are made permanent. When only a subset of the changes required by a multi-system operation are made permanent, the systems are left in an inconsistent state (e.g. the customer is charged for an airline ticket, but no seat is reserved for the customer).

When the database systems that are involved in a multi-system operation are tightly coupled, inconsistent states can be avoided using a technique referred to as two-phase commit. In two-phase commit, all systems wait until all other systems are "prepared" to make their changes permanent ("commit"). At that point, all systems commit in unison. If any system cannot achieve the "prepared" state, then all systems "roll back" to remove all changes made relative to the multi-system operation.

While the two-phase commit protocol guarantees that a multi-system operation is treated as an atomic unit (either entirely commits, or entirely fails), it does so at the expense of performance. For example, when the systems involved in the multi-system operation are not tightly coupled, the inter-system interactions required by the two-phase commit protocol may impose unacceptable delays. Further, one or more of the systems involved in the multi-system operation may not support the two-phase commit protocol.

To avoid having resources locked while waiting for other systems involved in a two-phase commit operation, techniques have been developed for avoiding two-phase commit in multi-system operations. One such technique is described in U.S. Pat. No. 7,904,434 entitled "Framework for handling business transactions". In the technique described therein, operational constraints set forth conditions that must be satisfied before an update is allowed to proceed. If an attempt is made to update a particular value that has changes that may be undone, then the database server determines a plurality of "possible result values" for the particular value. If the possible result values satisfy the operational constraint conditions, then the update is allowed to proceed.

Unfortunately, formulating such operation constraint conditions may not be straightforward or even possible for some types of multi-system operations. Further, it is possible that some systems involved in the multi-system operations do not support such operational constraints. Consequently, there is a need to perform multi-system operations in a way that does not impose the delays of two-phase commit, and that does not require the programming of operational constraint conditions.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for executing multi-system operations based on information stored in the commit logs of database systems. Specifically, assume that a particular multi-system operation requires a first set of changes in a first database system and a second set of changes in a second database system. According to one embodiment, the first changes are made by a first transaction in the first database system. When that first transaction commits, information about the first set of changes is stored in the commit logs of the first database system. The commit logs of the first database system are scanned and converted into an event stream.

The event stream is analyzed and, based on the analysis, a second transaction is executed in the second database system to perform the second set of changes. When the second transaction commits, information about the second set of changes is stored in the commit logs of the second database system. At a later time, the commit logs of both the first and second database systems may be read and analyzed to determine whether all changes required by the particular multi-system operation were performed successfully in all systems involved in the particular multi-system operation. Because the first transaction, the second transaction, and the correctness determination are made asynchronously, no synchronization delays are imposed on the individual transactions that collectively constitute the larger multi-system operation.

Operational Overview

Figure 1:
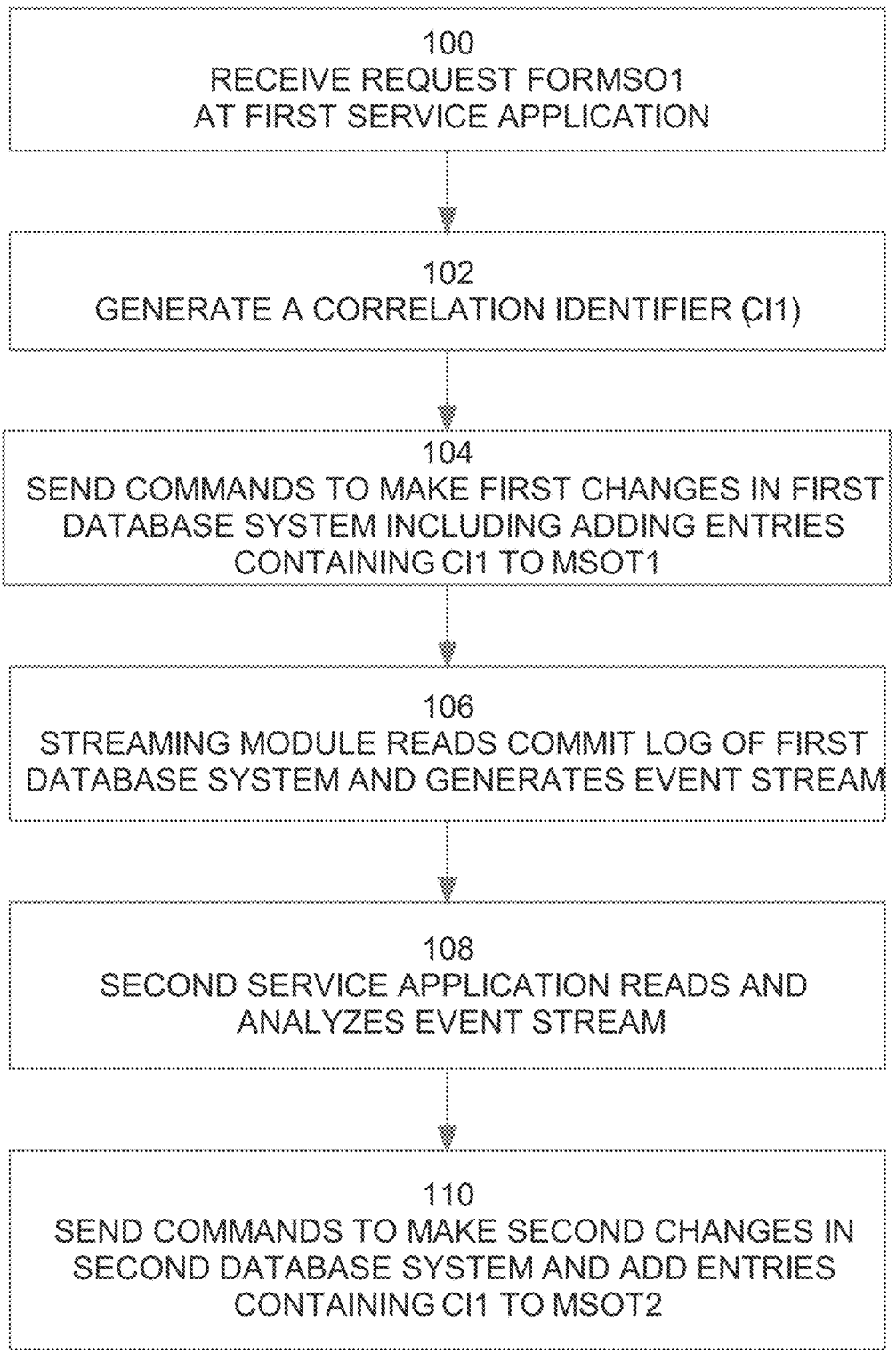
FIG. 1 is a flowchart for using a correlation identifier to identify changes, made in multiple systems, that are part of the same multi-system operation.
Figure 2A:
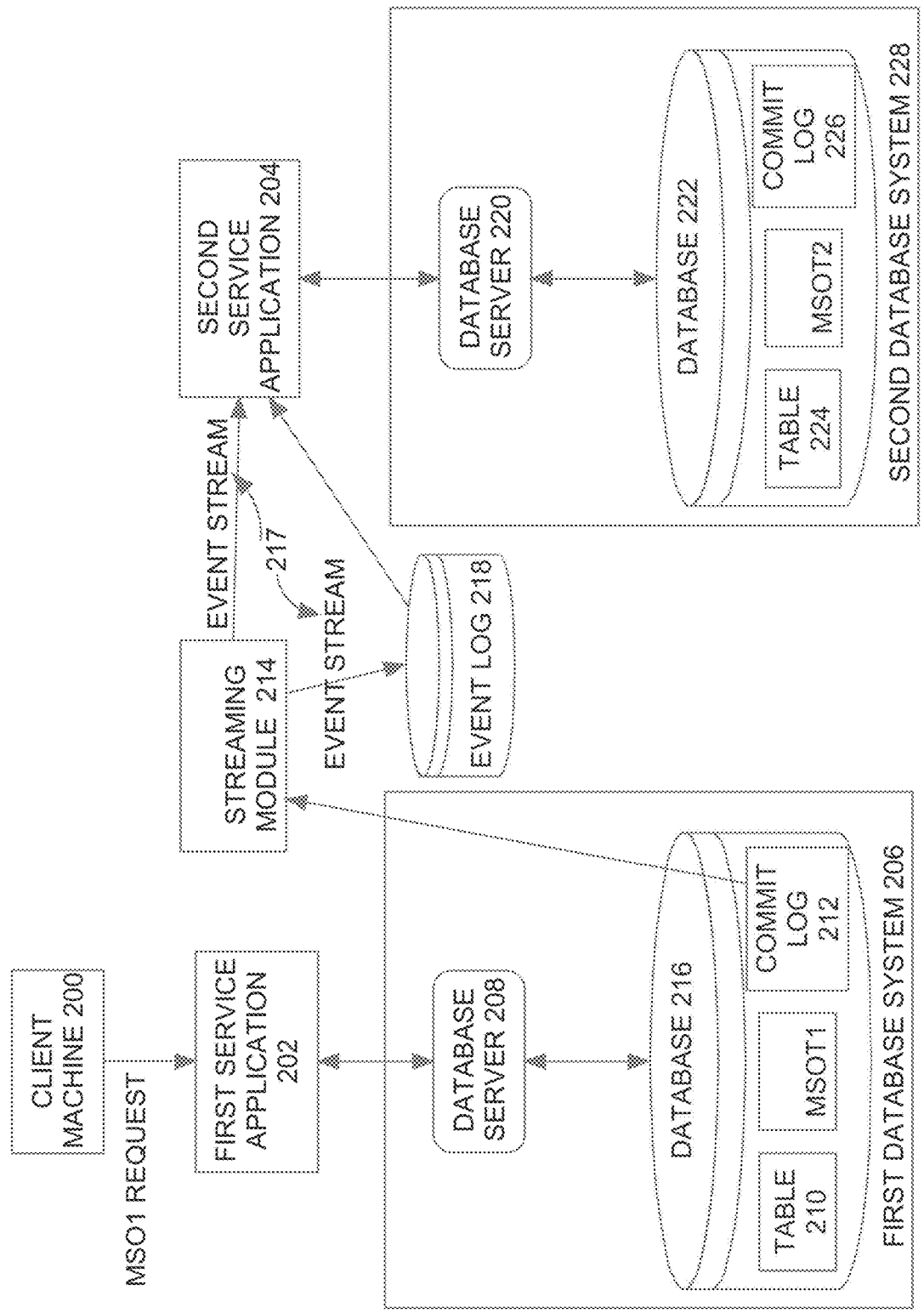
FIG. 2A is a block diagram that illustrates multiple computer systems using a correlation identifier to identify changes, made in the multiple systems, that are part of the same multi-system operation.

An overview of how multi-system operations may be performed based on the commit logs of database servers shall be given with reference to FIGS. 1 and 2A. FIG. 1 is a flowchart for performing a multi-system operation, according to an embodiment. FIG. 2A is a block diagram of computing devices used to perform the multi-system operation, according to an embodiment. For the purpose of explanation, a multi-system operation shall be described that involves two services. The programs that provided the two services are generally illustrated as first service application 202 and second service application 204. In the case where the multi-system operation is booking an airlines flight, first service application 202 may be the airline's reservation system, and second service application 204 may be a banking system that manages the account that is to be used to pay for the airfare.

Performance of the multi-system operation begins at step 100, at which a request to perform a multi-system operation (MSO1) is received. For the purpose of illustration, it shall be assumed that the request is in the form of an HTTP request made by a client machine 200, and that the request is received over the Internet by a web server that is associated with the first service application 202 that provides the first service (e.g. reserving a seat on a flight). It shall be further assumed that the multi-system operation requires first changes to be made in a first database system 206 associated with the first service (e.g. decrementing the number of seats available on the flight), and second changes to be made in a second database system 228 associated with a second service (e.g. reducing the account balance to reflect the ticket purchase).

At step 102, the first service application 202 generates a correlation identifier (CI1) for the multi-system operation. At step 104, the first service application 202 sends commands to database server 208 to cause the first database system 206 to make the first changes as part of a first database transaction (TX1). In addition to the first changes, as part of the same first transaction TX1, the first service application 202 also causes entries to be added to a first multi-system operation table (MSOT1) that is managed by the first database server 208. The entries that are added to MSOT1 include the correlation identifier CI1 and metadata related to the multi-system operation MSO1. The metadata included in the MSOT1 entries shall be described in greater detail hereafter.

When the first transaction TX1 commits, commit records for the first transaction are stored in a first commit log 212 of the first database system 206. Consequently, upon commit of the first transaction TX1, all changes made by the first transaction (including both those made to the multi-system operation table MSOT1 and those made to other tables (e.g. table 210)) will be reflected in commit records that are all assigned the same transaction identifier TX1-id. Specifically, the commit records for the first transaction TX1 will contain the before and after values of all data items changed by the first transaction TX1. As mentioned above, the changes made by the first transaction TX1 include storing the correlation identifier CI1 in the multi-system operation table MSOT1. Consequently, the after-update values of the commit records of the first transaction TX1 will include the correlation identifier CI1, so those commit records may easily be identified based on the correlation identifier.

At this point, the two database systems 206 and 228 are in an inconsistent state relative to the multi-system operation. Specifically, the changes that reduce the number of available seats have been committed to database 216, but database 222 has not yet been changed to reduce the account balance to pay for the airfare. Rather than have client machine 200 send a separate request to the second service application 204 to cause the second service application 204 to perform its part of the multi-system operation, the second service application 204 performs its part of the multi-system operation based on an event stream produced from the commit log 212 of database system 206.

Specifically, at step 106, a streaming module 214 reads the commit log 212 of the first database system 206, and generates a first event stream 217 therefrom. At step 108, a second service application 204 for the second service reads and analyzes the event stream (either directly or after the stream has been stored as an event log 218) to identify any multi-system operations that involve the second service. In the present example, the event stream will include one or more event records, associated with the correlation id CI1, for the multi-system operation MSO1. The second service application 204 recognizes MSO1 as a type of operation that involves the second service. Consequently, at step 110 the second service application sends commands to the second database system 228 to perform a second transaction TX2 that makes the second changes to complete the multi-system operation MSO1. The specific commands sent by the second service application 204 are based on the metadata obtained from the event records associated with CI1, which themselves were obtained from the commit records of the first database system 206. For the purpose of illustration, it shall be assumed that those changes include adjusting an account balance, which is stored in a row of table 224, to indicate that funds were used to buy airfare.

In addition to the second changes, as part of the same second transaction TX2, the second service application 204 also causes entries to be added to a second multi-system operation table (MSOT2) that is managed by a second database server 220. Similar to the entries added to MSOT1, the entries that are added to MSOT2 include the correlation identifier CI1 and metadata related to the multi-system operation MSO1.

When the second transaction TX2 commits, commit records for the second transaction are stored in a second commit log 226 of the second database system 228. Consequently, upon commit of the second transaction TX2, all changes made by the second transaction (including both those made to the multi-system operation table MSOT2 and those made to other tables) will be reflected in commit records that are all assigned the same transaction identifier TX2-id. Specifically, the commit records for the second transaction TX2 will contain the before and after values of all data items changed by the second transaction TX2. The after-update values of the commit records for the changes to the multi-system operation table MSOT2 include the correlation identifier CI1, so those commit records may easily be identified based on the correlation identifier.

Upon commit of the second transaction TX2, the databases 216 and 222 involved in the multi-system operation MSO1 are consistent. Specifically, the committed changes of table 210 reflect the reservation was made, and the committed changes of table 224 reflect the account balance reduction due to the airfare purchase. Further, the commit records in both commit logs 212 and 226 that relate to MSO1 are associated with the same correlation identifier (i.e. CI1). As shall be explained in greater detail hereafter, the fact all systems have associated the same correlation identifier (CI1) with the changes made for the multi-system operation allows a reconciliation system to determine whether the multi-system operation completed successfully.

Figure 2B:
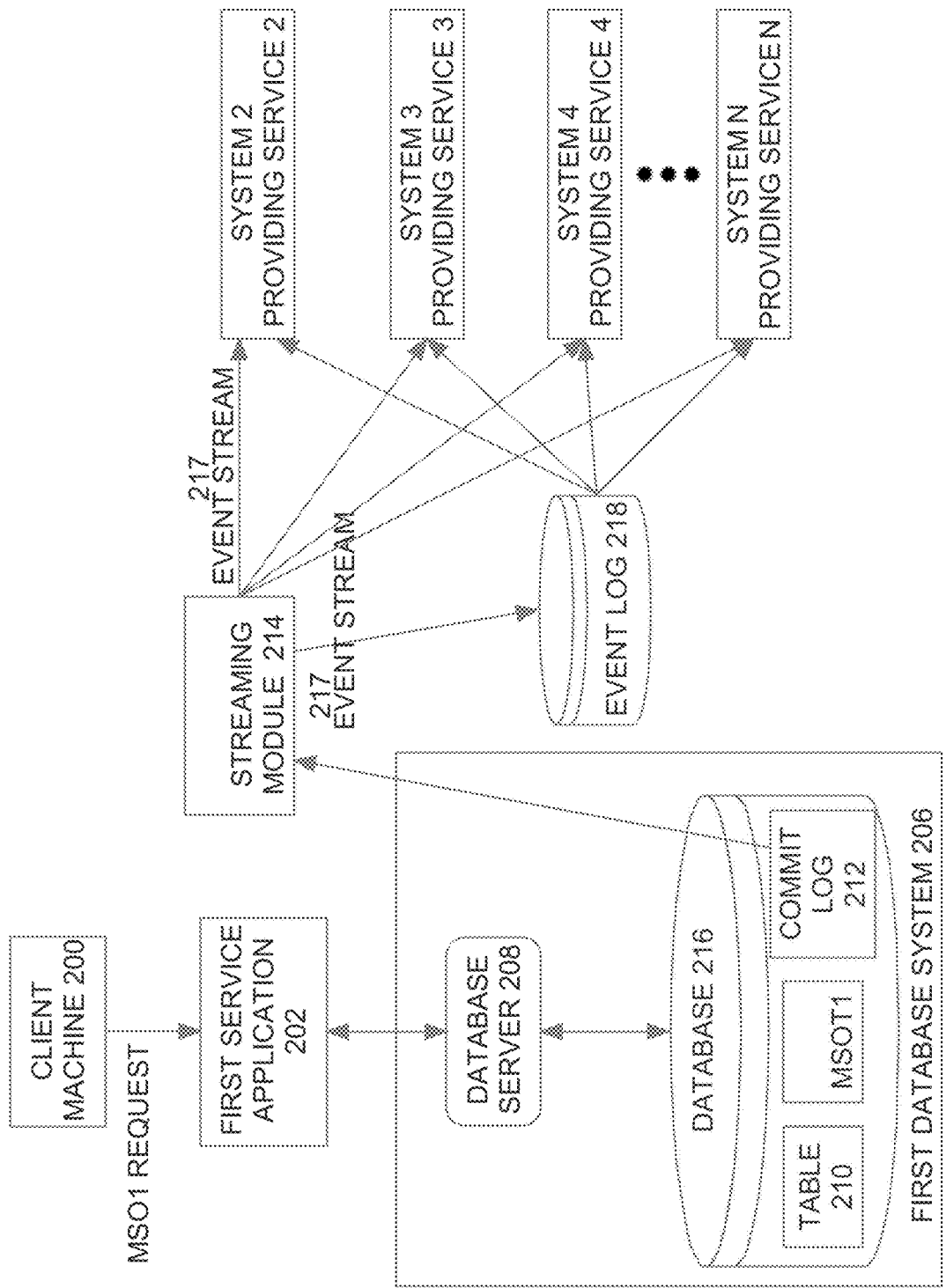
FIG. 2B is a block diagram that illustrates how the event stream from one system's commit log can be fed to any number of additional systems, causing those additional systems to perform their part of any multi-system operations that are reflected in that commit log.

In the present example, only two services were involved in the multi-system operation MSO1. Consequently, once TX1 has been committed in the first database system 206 and TX2 has been committed in the second database system 228, the multi-system operation MSO1 has been completed. However, a multi-system operation may involve any number of systems. For example, FIG. 2B is a block diagram that illustrates how the event stream from one system's commit log can be fed to any number of additional systems (e.g. systems 2-N), causing those additional systems to perform their part of any multi-system operations that are reflected in that event stream.

Multi-system operations are not complete until the necessary changes have been committed in each of the systems involved in the multi-system operations. Unfortunately, it is possible that some of the systems are unable to complete their respective portion of the multi-system operation. Thus, techniques shall be described hereafter for determining whether a multi-system operation completed successfully.

Populating the Commit Logs

As explained above, the commit logs of a transaction involved in a multi-system operation are populated ("injected") with information required for other systems to determine what they must do as part of that multi-system operation. To ensure that the commits logs will have the requisite information, this information is inserted into a multi-system operation table (also referred to as the BizOP table) as part of the same database transaction that is making the changes required by the multi-system operation. The term "correlation context" refers to the information each system involved in the multi-system operation stores/propagates as part of the multi-system operation. As shall be explained hereafter, the correlation context may include many attributes in addition to the correlation identifier.

During the processing of the commit logs, an event stream is generated. For each event represented in the event stream, there is information about the event that may be referred to as the "event payload". The event payload is controlled by the application itself, because the application of each service that determines what information should be stored in the BIZ-OP table (and committed as part of the same database transaction that is making changes to the other tables used by the service). For example, the event payload for event created by the update to the loan app table (in the creation of a new loan application) should have enough information for person service to extract the person data for the corresponding update that the person application needs to make to the person app table.

Streaming Modules

In FIG. 2b, streaming module 214 generates an event stream 217 based on information from the commit log 212 associated with the first service application 202. Each system involved in a multi-system operation may have such a streaming module. The streaming modules produce "event records". In one embodiment, the event records are ultimately stored in a reconciliation repository. In one embodiment, the reconciliation repository includes a database that can be used for a variety of purposes, including the generation of graphs, and learning what "normal behavior" is for each type of multi-system operation. Once the normal behavior is determined, each new execution of a multi-system operation may be compared to the normal behavior to detect anomalies.

Child Events

In one embodiment, information about all events are stored in an event table, and information about which events have been consumed, and by whom, are stored in a consumption table. On the consumer side, an event can have more than one consumer, so more than one system can process the same event. Thus, a one-to-many relationship is possible between events and consumers.

A single high-level business operation may spawn multiple child operations. For example, when borrower does a payment on a loan, there may be multiple investors who invested the loan. The high-level business operation will correspond, for example, to payment OF 100 dollars which caused the creation of one entry in a row of the BIZOP table. That one row would indicate a business operation payment. However, assume that there are 10 investors in that loan, that payment operation may trigger 10 child business operations, each of which is payment of one of the ten investors. However, a parent operation and all child operations are treated as one business operation, with a single correlation identifier even if the operation touches 10 tables. That is, the child operations inherit the correlation ID of the parent.

Heartbeat Events

According to one embodiment, artificial "heartbeat events" are inserted into a heartbeat table every minute. Heartbeat events do not correspond to any actual multi-system operation. However, the generation of artificial heartbeat events at a predictable schedule allows the system to check its own health. Specifically, if the heartbeat events cease to appear in the event stream that is generated for a particular service, it is likely that something has gone wrong with the service and corrective measures may be initiated.

Correlation Context

The correlation identifier is the metadata that ties together the records of the events that are all part of the same multi-system operation. However, according to one embodiment, the correlation identifier is merely one of many pieces of metadata, for the multi-system operation, that are intentionally injected into the commit logs (by inserting the metadata into an MSO table as part of the transaction that is making the other changes for the MSO).

According to one embodiment, the correlation context includes a history of actions taken as part of the multi-system operation associated with a given correlation identifier (i.e. who called where and when). The history may indicate a sequence number, the source of each call, the name of the service that was called. It may also include the caller ID, the client IP and the additional information that identifies who was the user who actually logged in. Additional details on the content of the correlation context is given hereafter.

Content of the Correlation Context

As explained herein, the correlation context is used in asynchronous "eventual consistency" multi-system operations in which event records derived from the commit log of one system are used to drive additional operations (which are all part of the same multi-system operation) in other systems. For example, a loan system may get a payment. This payment could be processed in system A, and then two days later the record of the event (including the correlation context) can be propagated to system B to cause system B to perform something as part of the same multi-system operation. The correlation context may be used in multi-system operations that include multiple asynchronous transactions in multiple systems. The time that passes between two systems performing their respective parts of the same multi-system operation can be seconds, minutes, hours, or even days.

In one embodiment, when a service receives an initial HTTP call (or an internal system process initiates a multi-system operation), a correlation context is created with just two characteristics. An example of an internally-initiated multi-system operation would be when a scheduled process obtains a payment from a client account. It is not an HTTP but rather an internally-initiated call.

For the purpose of explanation, an example shall be given in which the multi-system operation is initiated by an HTTP call to a service application. In response, the service application may create a correlation context with the following fields:

corrId (correlation identifier)
corrSourceId (correlation identifier's origination application)
seq (sequence number)
callerID (caller ID of the consumer)
clientID (provided by the UI services, e.g. browser id)
userID (UI login user id)
client IP (source client IP address)

In JSON format, a particular instance of a correlation context may appear as:

```
{
    "corrID"       : "4dd0bbfa-126d-4003-b476-bbee21727361",
    "corrSourceID" : "auto-funnel",
    "seq"          : 4,
    "callerID"     :"LcService",
    "clientID"     :"...unique string...",
    "userId"       :"12345"
    "clinetIP"     :"127.0.0.1"
}
```

In addition to the fields already discussed herein, the correlation context may include additional fields. Such additional fields may include, for example, module names of the modules, within any given service, that performed work that was part of the multi-system operation.

Propagation of the Correlation Context

As mentioned above, the correlation context of a multi-system operation may be injected into the commit logs of database systems that perform the work required by the multi-system operation. The actual content, format and use of the correlation context may be established in such a way as to improve the performance of the computer systems involved in the multi-system operation. According to one embodiment, the correlation context gets propagated, or sent around in multiple communication channels. Specifically, the applications involved in a multi-system operation may communicate with different protocols. Such protocols include, but are not limited to, TCP, HTTP, messages, events, etc. Further, the correlation context may be contained in or transferred inter-system with files produced by one system that are imported into another system.

The correlation context is propagated internally within an application, across applications, and propagated to external tools involved in the multi-system operation. Consequently, the work done by such external tools can be analyzed and, using the correlation context, what happened external to an application can be related back to what happened within the application.

Dynamically Enriching the Correlation Context

According to one embodiment, the correlation context that is sent between the systems involved in a multi-system operation is not static. Rather, while the correlation identifier remains constant, other metadata within the correlation context may be enriched on the fly. For example, the systems involved in the multi-system operation may add more attributes as tasks are performed as part of the multi-system operation to which the correlation context corresponds.

For example, in one embodiment, the correlation context may start out with only two attributes: the correlation identifier (uniquely identifying the multi-system operation) and an aggregate root identifier (uniquely identifying the highest-level object of the service that was first called to initiate the multi-system operation). When the correlation context is passed to an entity that is able to identify the type of the business operation being performed, an additional attribute "operation type identifier" may be added to the correlation context. In one embodiment, the operation type identifier is a label given to the high-level business operation that is being performed by the service. Within one correlation (identified by a single correlation ID) it is possible to perform multiple business operations of different types. The operation type identifier may be accompanied by a sub-type identifier, which would typically be information that is inserted by the application itself.

When a system involved in the multi-system operation performs some work for the operation as part of a transaction, the transaction identifier for that transaction may be added to the correlation context. Similarly, when a particular application performs work relating to the multi-system operation, an application identifier for the application may be added to the correlation context. Thus, the attributes reflected in the correlation context at any given time may indicate where, within the business flow of that type of business operation, the particular multi-system operation is currently at.

During the life of a multi-system operation, the correlation context associated with the operation can expand (attributes added), or contract (attributes removed), thereby reflecting the current state of the multi-system operation. This correlation context of a multi-system operation is available whenever these operations involve a database (the context will be persisted as part of database operation, for example). If the multi-system operation involves some kind of message queue, then the correlation context becomes part of those messaging events.

With respect to the dynamic enrichment of the correlation context, the correlation context is used to track multiple communications that occurred as part of the multi-system operation. For example, if service does multiple calls to other services, back and forth, back and forth, the correlation context can be used to keep track of those calls. The system can use the correlation context to determine that two entities involved in the multi-system operation communicated only four times, three times, or two times, etc.

In the example correlation context illustrated above, the sequence number is 4. When the correlation context is first created the sequence would be 0. The sequence number is incremented in response to each call made as part of the same multi-system operation, that occurs after the correlation context is created.

Figure 7:
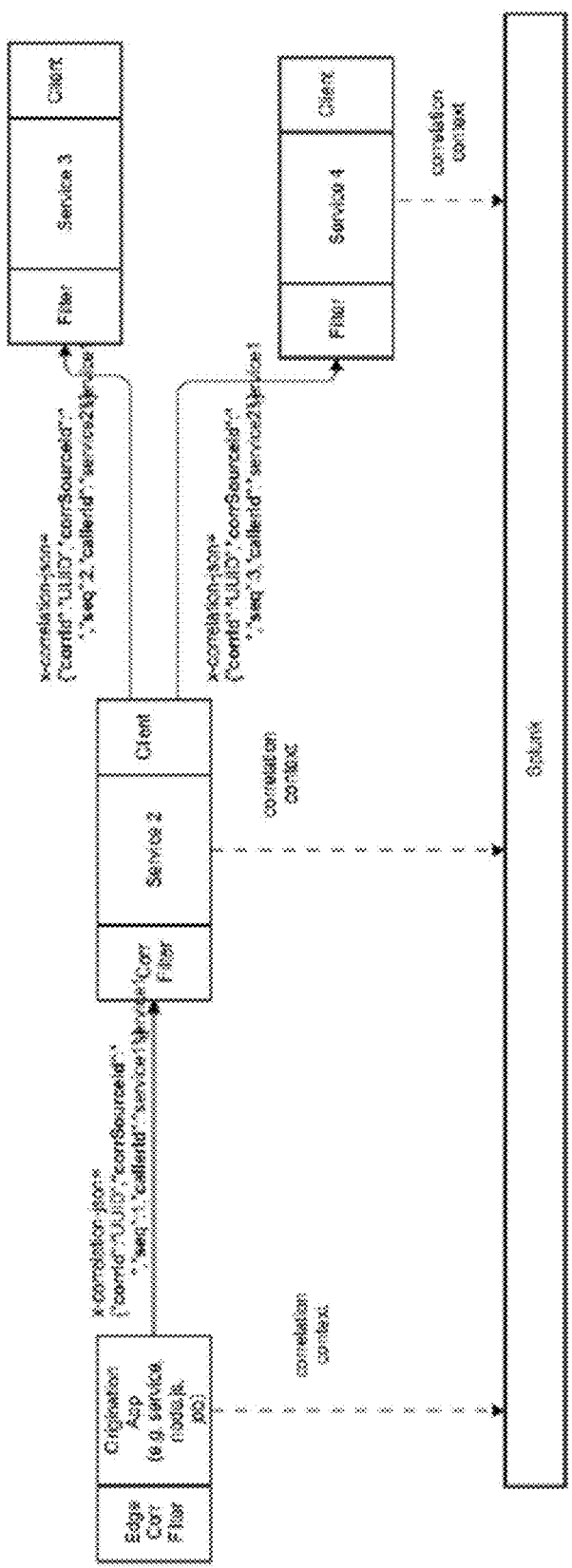
FIG. 7 is a block diagram that illustrates the dynamic changes to the content of a correlation context as a multi-system operation propagates through multiple systems.

Referring to FIG. 7, it is a block diagram that illustrates the content of the correlation context in a multi-system operation that is initiated by a call to an "Origination App", where the origination app calls a service 2 and the service 2 calls services 3 and 4. In addition to those calls, the origination app, service 2 and service 4 also pass the correlation context in interactions with an external tool (Splunk).

In one embodiment, at the time the correlation context is created, sequence number is going to be zero, the caller ID is going to be null, the client IP is going to be the client IP of the system that is initiating the call. Then, when another call is made as part of the same multi-system operation, the correlation context will change: The sequence is going to be one, incrementing the sequence. In addition, the correlation context will be updated: the caller ID is going to be the previous caller (where it started from), and the client ID is updated to show the current client ID. In one embodiment, the correlation context is updated to reflect any form of inter-system communication that is made as part of the multi-system operation, and not just HTTP calls.

When a call reaches the service, the service can detect who made the call, do authentication authorization, and then inject that user who actually requested this activity in the service. As mentioned above, this and other metadata about the multi-system operation can be "injected" by inserting the data into a multi-system operation table (a.k.a. BizOp table) and then committing those inserts as part of the same transaction that made, in that same system, the other changes required by the multi-system operation.

In response to the initial call, the service application generates this a unique ID for the multi-system operation (the correlation ID). In addition to the correlation ID, the service also stores in the correlation context information that identifies itself (the service that was originally called). In the example given above, the originator is the "auto-funnel" service. Initially, the "caller" attribute may be empty. If the initial call came from a UI, then the system may be able to obtain a "client ID" to put in the correlation context. The "client ID" may, for example, identify a particular web browser as the "client ID" when the call is initiated through a browser. "Client IP" indicates the IP address used by the client to send the message that initiated the request. Once a service (e.g. auto funnel) makes the call downstream, it becomes a caller for downstream call.

The "client IP" is the IP address of the client. Significantly, even though a person using the service does not change, the client IP may change (based on the firewall, etc.). However, Client ID is like a cookie ID, so that type system can keep track that of the same person coming back within a day and logging in again with a different IP, because that person is still going to have the same Client ID.

With respect to the client ID, the system may initially drop a cookie, with some random ID, and the system can then use that client ID to identify that it is the same person coming back each time, even though it could be from a new IP address With respect to the User ID, this dynamically changes. It is the ID how the calling entity is authorized against this particular service that was called. If a user calls a first service, and the first service calls a second service, then for the first call the User ID would reflect the user authorized to use the first service, and then for the second call the User ID would reflect how the first service authorized to use the second service.

In one embodiment, the newly-created correlation context does not have any sequence number attribute. The attribute is added to the correlation context, with the value "1", when the initially-called service makes a call. However, in an alternative embodiment, each new correlation context has a sequence attribute, and the value of the attribute is set to "0".

If the initially-called service does something (e.g. stores records to a database, or makes a call, or makes a message, sends a message), the system adds metadata about that action to the correlation context.

As shall be describe hereafter, this correlation context is piggybacked onto every message sent by the service, and committed with any changes that are persisted to a database system. Those systems that receive the correlation context, they also piggyback it on any interactions they have as part of the same multi-system operation. In addition, they supplement it and enrich it with tags containing their own information.

As an example, service A receives an HTTP call and performs operations as part of a multi-system operation. Service A creates a correlation ID, and adds tags to the correlation context. Then service A makes a call to some other service B, as part of the same multi-system operation. It piggybacks the correlation context onto that call. Service B would then enrich the correlation context by adding its own tags. For example, service B will change (increment) the sequence number.

If service B makes another call, service B would put itself (service B) as the new caller ID. The caller ID is whoever initiated the call in question. The current version of the correlation context will have the caller ID of the most recent call initiator in the multi-system operation. For a call from service one to service two, the correlation context would say caller ID=service one. Once service two calls service three, the correlation context is changed so that caller ID=service two.

The correlation identifier does not change as the multi-system operation progresses. However, the correlation context does. Each system records the correlation context as it existed when that system did its part of the multi-system operation. Consequently, when the records of all systems are collected (for example, by a reconciliation system), a complete history of the multi-system operation may be constructed. The history may include, for example, a call graph (who called who, and when) as well as the actual changes made within each system as part of the multi-system operation.

Because each system records the correlation context at the time the system performs its part of the multi-system operation, later systems can overwrite existing information in the correlation context with their own information without the prior information being lost. Thus, why the correlation context is continuously changing, the size of the correlation context is not necessarily continuously increasing.

In one embodiment, at each call, the sequence ID is incremented, the caller ID usually gets updated (overwritten). The Client ID may stay the same if it's there. The User ID gets updated all the time (It depends, again, how you authorized against that service). Thus, when service one calls service two, how service one is authorized against service two will be the new user ID.

According to one embodiment, any communication that a system (involved in the multi-system operation) does with any other system, regardless of the protocol, the correlation context (including the correlation ID) is piggybacked in those communications. Each of the other systems is designed to store the correlation context in such a way that when everything is pulled together again, they could make the calling graph.

Subscribing to Operation Types

In the scenario illustrated in FIG. 2B, each of systems 2-N analyzes all of the events in event stream 217 (either directly or by reading event log 218) to find events that would require actions to be taken by their respective service applications. Rather than have each service application examine all such events, the event stream 271 (or event log 218) may be managed by a publish/subscribe system, where streaming module 124 "publishes" event records to the event log 218, and each of the service applications subscribes to the event records that are associated with operation types that involve the service. For example, system 2 may be for a financial transaction service, and thus may only subscribe to event types that involve financial transactions. On the other hand, system 3 may be for a service that manages employee records, and thus may only subscribe to event types that involve employee records. Because each service application would only consume event records for those event types to which it subscribes, the analysis performed by systems 2-N is simplified and inter-system security is improved.

Post-Facto Reconciliation

As explained above, using the techniques described herein, the changes made in each system involved in a multi-system operation are not made atomically relative to the changes made in each other system involved in the same multi-system operation. Thus, it is possible to have situations in which one or more of the systems involved in a multi-system operation are unable to complete their part of the operation. Consequently, it is desirable to have a mechanism to determine, after the fact, whether all portions of a multi-system operation have been successfully completed.

Figure 3:
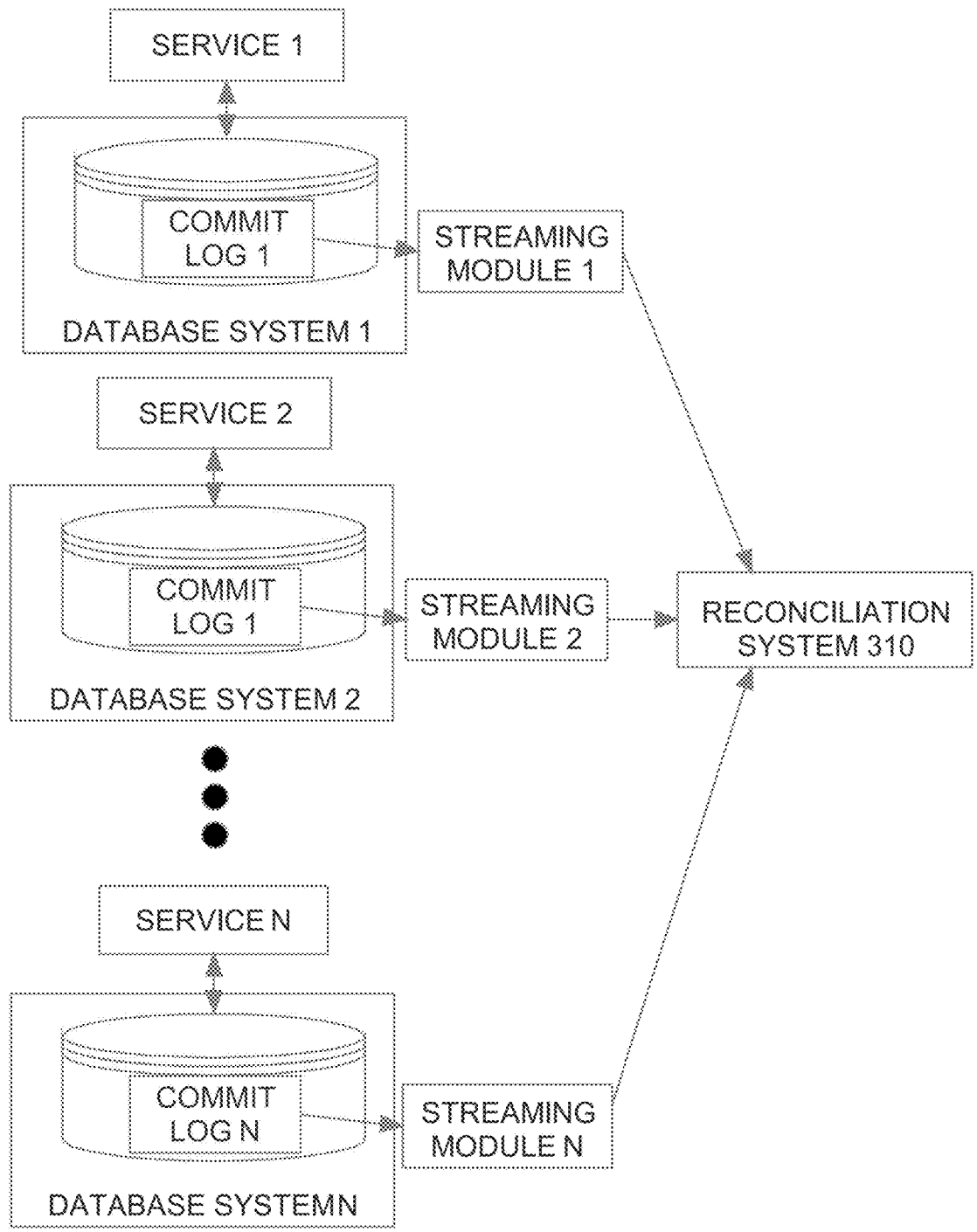
FIG. 3 is a block diagram of a reconciliation system that uses the event streams from the commit logs of the multiple computer systems involved in a multi-system operation to determine whether the multi-system operation completed successfully.

Referring to FIG. 3, it is a block diagram of a reconciliation system 310 according to an embodiment. Reconciliation system 310 is configured to receive the event streams from any number of streaming modules (e.g. streaming modules 1, 2, N), each of which is associated with separate service. Rather than receive the event records directly from the streams, reconciliation system 310 may obtain the event records from event logs that store the output of the streams. Further, as mentioned above, each service may actually generate several event streams in parallel, rather than the one-stream-per-service scenario shown in FIG. 3.

Reconciliation system 310 groups the event records obtained from the event streams based on correlation ID. Thus, each group will correspond to a distinct correlation ID, and will contain all events, from all systems, that have that same correlation ID. Once all event records for a given correlation ID have been identified, reconciliation system 310 determines whether everything that needed to happen for the multi-system operation associated with that correlation ID did actually happen for that correlation ID. If everything that needed to happen did happen, then reconciliation system 310 treats that multi-system operation as successful. Otherwise, reconciliation system 310 treats that multi-system operation as having failed, and remedial measures are taken.

According to one embodiment, the determination of whether a multi-system operation has succeeded is only performed when the multi-system operation is "ripe" for analysis. A multi-system operation may not be ripe for analysis immediately after the correlation ID for the multi-system operation is first seen by reconciliation system 310. For example, assume that a particular type of multi-system operation (OP-TYPE-X) requires changes in both database system 1 and database system 2. Assume further that, under normal conditions, the event records for an occurrence of OP-TYPE-X are not produced by streaming module 2 until two hours after the event records for the same occurrence of OP-TYPE-X are produced by streaming module 1. Under these conditions, it would not be desirable for reconciliation system 310 to conclude that a particular occurrence of OP-TYPE-X has failed simply because reconciliation system 310 sees an event record with a particular correlation ID for an OP-TYPE-X operation from streaming module 1 and no event records with that correlation ID from streaming module 2. Rather, under these circumstances, the validation analysis for the OP-TYPE-X operation is only ripe after two hours have elapsed since reconciliation system 310 has seen a correlation ID for an occurrence of OP-TYPE-X from streaming module 1. At that point, if reconciliation system 310 has still not seen any event with that correlation ID from streaming module 2, reconciliation system 310 may determine that the operation failed.

In one embodiment, machine learning is employed to generate the rules for determining whether a particular type of transaction has completed successfully. In an embodiment that employs machine learning to generate the rules for post-facto reconciliation, the machine learning system learns the rules based on the logs from previously executed operations of the same type. For example, based on historic records, the machine learning system may know that other business operations of the same type end up with multiple entries in multiple databases of multiple services, and it knows how much time for all these to happen. If a thousand prior executions of the business operation follow the expected pattern, the machine learning system knows what that particular type of multi-system operation supposed to look like. Deviations from that pattern may be flagged as anomalies.

Building Communication Graphs Based on the Correlation Context of a Multi-System Operation According to one embodiment, the presence of the correlation context in the logs/events/messages of each system involved in a multi-system operation enables an analyzer system to use the data from the correlation context of the multi-system operation to build a communication graph that illustrates the communications that occurred as a result of execution of the multi-system operation.

Such communication graphs are useful for tracing, debugging and troubleshooting. However, in one embodiment the communication graphs are also use for analysis and other purposes. Thus, a communication graph can be used to see what kind of activity is happening in the system, and based on the graph, it may be evident what triggered a loan, and that the loan creation impacted five other services external to the loan app service itself. In one embodiment, an analysis system builds a "live flow graph" which can be used both for debugging and for discovery (auto-discovery and/or delay discovery for activity in the systems).

Using Communication Graphs for Discovery and Anomaly Detection

As mentioned above, one use of communication graphs is to detect anomalies. An anomaly may be indicated, for example, when two occurrences of the same type of business operation result in significantly different graphs. The dissimilarity of the graphs indicates that something has changed in how the system performs that particular type of multi-system operation. The difference may be cause by a new module being added to the business flow (in which case the divergence in the graphs does not represent a problem) or because there has been anomalous behavior that must be addressed. When the same system with the same version of applications is performing the same type of business operation, the anomaly detection system should see most of the same type of activities graph. When a new version of an application is deployed, the graph may change because some new components are being used. That is, the graph now reflects that something happened that had never been executed.

Because the context changes, depending on what the flow actually is, an anomaly detection system can detect what the flow actually is and compare that to what the flow has been in the past, what it is currently expected to be. Based on automatically determined expectations, the anomaly detection system can use the expectations as a reconciliation tool to decide when something strange happens, or didn't happen and should have happened.

Figure 5:
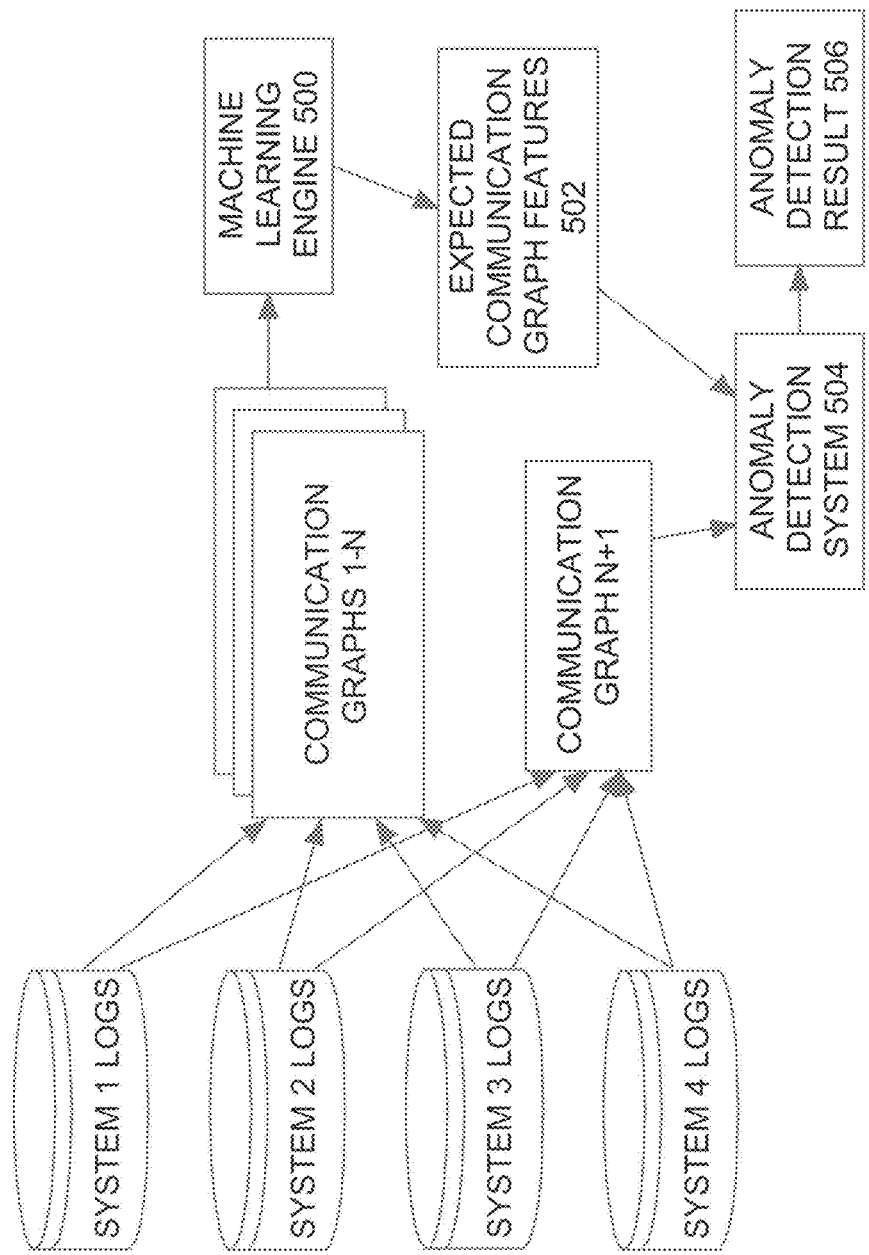
FIG. 5 is a block diagram illustrating how historical communication graphs may be used to detect anomalies in a current instance of a multi-system operation.

Referring to FIG. 5, it is a block diagram that illustrates how communication graphs of prior instances of a particular type of multi-system operation may be used to detect whether a current instance of the particular type of multi-system operation is anomalous. Referring to FIG. 5, communication graphs 1-N are created based on the information obtained from the logs of systems 1-4. As explained above, each of those communication graphs corresponds to a distinct correlation identifier, and is built from the correlation context information, associated with that correlation identifier, that is stored in the logs of systems 1-4. Those N communication graphs are fed as a training set into machine learning engine 500. Once trained, machine leaning engine 500 uses the model produced by the training to determine what features (expected communication graph features 502) the communication graph of that particular type of multi-system operation is expected to exhibit.

One the expected communication graph features 502 have been derived based on the historical communication graphs 1-N for that particular type of operation, new instances of that particular type of operation may be analyzed to determine whether they conform to those expectations. For example, assume that expected communication graph features 502 are for an operation type X. When a new instance of operation type X is executed, a communication graph N+1 may be generated for the new instance based on the correlation context information in the relevant system logs. An anomaly detection system 504 may compare the new communication graph N+1 against the expected communication graph features 502 of operation type X to generate an anomaly detection result 506. The anomaly detection result 506 may simply indicate whether the new instance of the operation type X qualifies as an anomaly, or may be a more sophisticated indication of whether the new instance deviates from expectations and, if so, how much and in what ways.

Learning "Normal" Activity of a Multi-System Operation

As explained above, communication graphs of prior executions of a particular type of multi-system operation can be used to determine what activity is "normal" for that particular type of multi-system operation. In one embodiment, the "normal" activity includes both which actions occurred (e.g. system A called system B) but also the timing of those actions. For example, based on the event information stored for prior executions of operation type X, a machine learning system may learn the average time that it takes for each action to happen.

Once the actions and timings of "normal" activity are known, rules may be established for determining what type of activity for that particular type of multi-system operation is anomalous. The rules may relate to activities (e.g. a multi-system operation is anomalous if more than 5 records are created in system B), to timing (e.g. a record should be created in system B within 5 minutes of changes being committed in system A), or to both.

Pre-Emptive Expectation Propagation

Post-facto reconciliation and anomaly detection involve using injected/logged information about a multi-system operation to determine whether the operation completed successfully in all systems, and/or whether it exhibited behavior that significantly deviated from the expectations for that particular type of multi-system operation. However, rather than mine the logs for errors after the fact, the same pattern information/rules may be used to pre-emptively flag potential problems.

For example, assume that it has been determined (through machine learning or human observation) that for operation type X, action B should happen in system B within five minutes of action A happening in system A. According to one embodiment, these expectations can be used to pre-emptively communicate expectations to the relevant systems. For example, in response to detecting that action A happened in system A, a pre-emptive message may be sent to system B to indicate that action B should happen within five minutes of the occurrence of action A. If system B does not take action B within five minutes, then system B may generate an alert that the multi-system operation in question is deviating from expectations.

The rules used to pre-emptively detect anomalies may be generated by training a machine learning engine, or may simply be manually formulated based on a human analysis of past operation. For example, the system may track the timing at which things normally happen during a particular type of multi-system operation. Such timing information may indicate how quickly the system should see 'X' when 'Y' happens, when X and Y are operations performed by different services as part of the same multi-system operation.

Based on an expectation model for a particular type of multi-system operation (created manually or by a trained machine learning engine) it is possible know how much time normally lapses between events involved in that type of multi-system operation. For example, since each one of the INSERTS in the BizOp table will also have the create date, it is possible to know how long does it take on the average between the time that (a) a loan app is created by the loan app service and (b) the person is inserted into the person table in the database used by the person service. Based on this knowledge, events that occur in one system involved in a multi-system operation may trigger the sending of expectation messages to one or more other systems involved in the multi-system transaction. If the other system does not perform the act identified in the expectation message in the time period specified in the expectation message, an alert is generated indicating a problem may have occurred.

Figure 6:
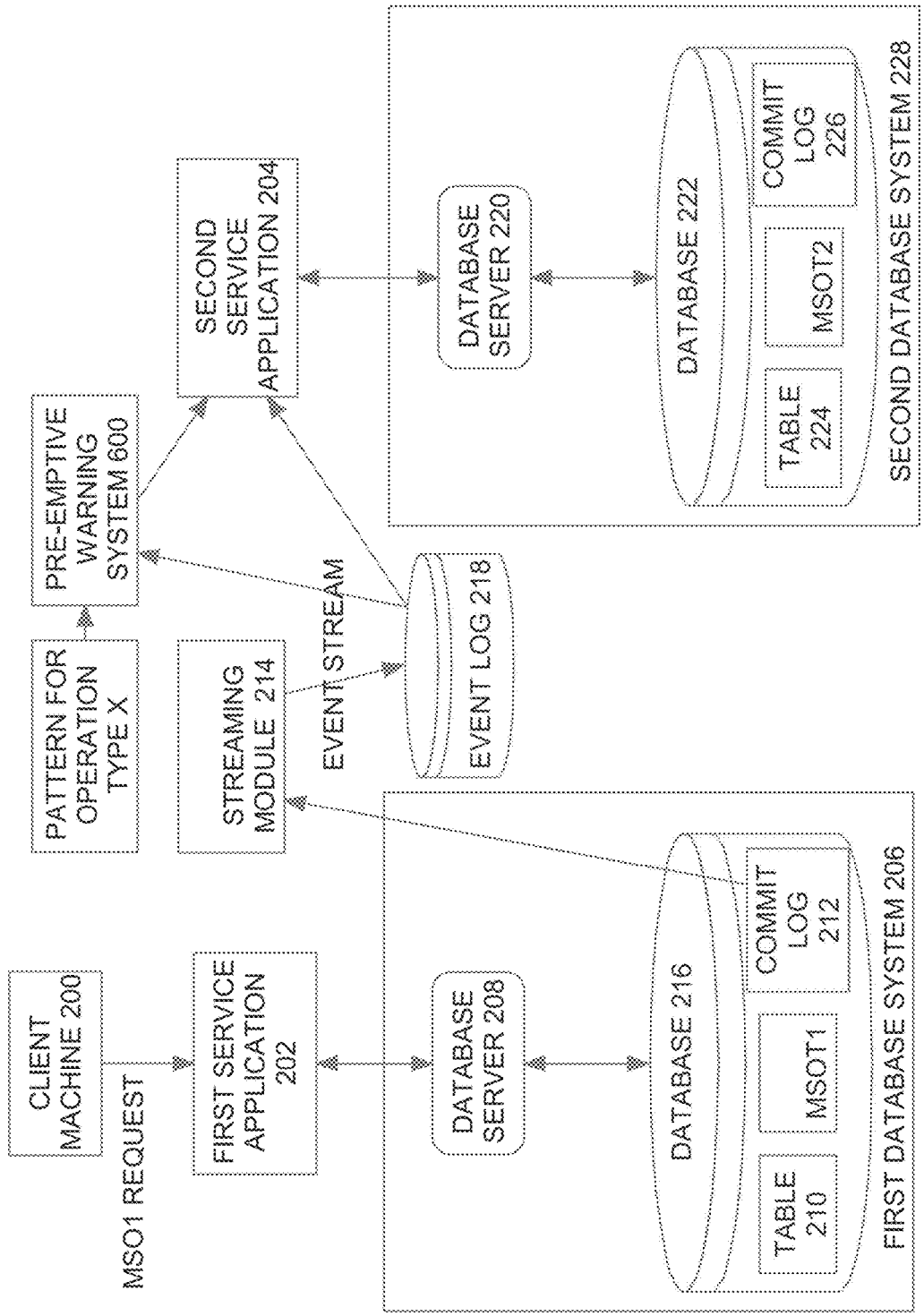
FIG. 6 is a block diagram illustrating the system of FIG. 2A with the addition of a pre-emptive warning system, according to an embodiment.

FIG. 6 is a block diagram illustrating the system of FIG. 2A with the addition of a pre-emptive warning system 600. Pre-emptive warning system 600 reads the pattern that a particular type of operation (operation type X) is expected to follow. As mentioned above, this pattern information may be derived by training a machine learning engine based on correlation context information from previously-executed multi-system operation of the same type. Typically, the pattern would include expected timing information, such as "action B should happen in system B within 5 minutes of A happening in system A".

Based on the pattern information for operation type X, pre-emptive warning system 600 monitors the event log 218 to find any events relating to operation type X. In response to detecting an event that indicates that action A occurred in database system 206 for an operation of type X with correlation identifier X, pre-emptive warning system 600 may send an expectation message to second service application 204. The message may indicate that the second service application 204 should perform an action B for the multi-system operation with correlation identifier X within five minutes. If second service application 204 does not perform action B for the multi-system operation with correlation identifier X within 5 minutes, an alert may be raised.

Automated Fixes

As explained above, the multi-system operations performed using the techniques described herein involve transactions that are asynchronously committed relative to each other. Consequently, when an anomaly is detected, the fact that some of the system may have committed their changes makes it impossible to simply "rolled back" the entire multi-system operation. Often, the solution is to execute a compensation transaction that fixes the inconsistency. For example, if system A inserted the data for a loan, but the person record did not show up in system B according to the expected timing, the problem may be fixed by manually executing a compensation transaction that inserts the person record in system B.

After automating the detection of anomalies, and storing a history of how the anomalies were fixed, rules can be formulated to automatically fix them. For example, for a multi-system operation where something went wrong, the system can capture the data that is in a stream and use that information to automatically fix it later, instead of manually entering any fix.

According to one embodiment, in addition to detecting anomalies, the system also tracks the manual fixes that were made to correct the anomalies. Both the anomalies and the manual fixes made to correct the anomalies are fed to a machine learning engine. Once trained in this manner, the machine learning engine generates a "fix suggestion" that regarding how to fix a newly identified anomaly. To avoid erroneous fixes, the fix suggestion may simply be presented to a user, rather than applied automatically. After reviewing the fix suggestion and determining that it is correct, the user may simply select a control to cause the fix suggestion to be executed.

In one embodiment, the automated fix system may track the number and/or percentage of times that the user has executed the automatically presented fix suggestion. In cases where the fix suggestion for a particular anomaly is always or nearly always executed, the user may be presented with an option to cause the automated fix for the particular type of anomaly to be executed automatically in the future.

Figure 8:
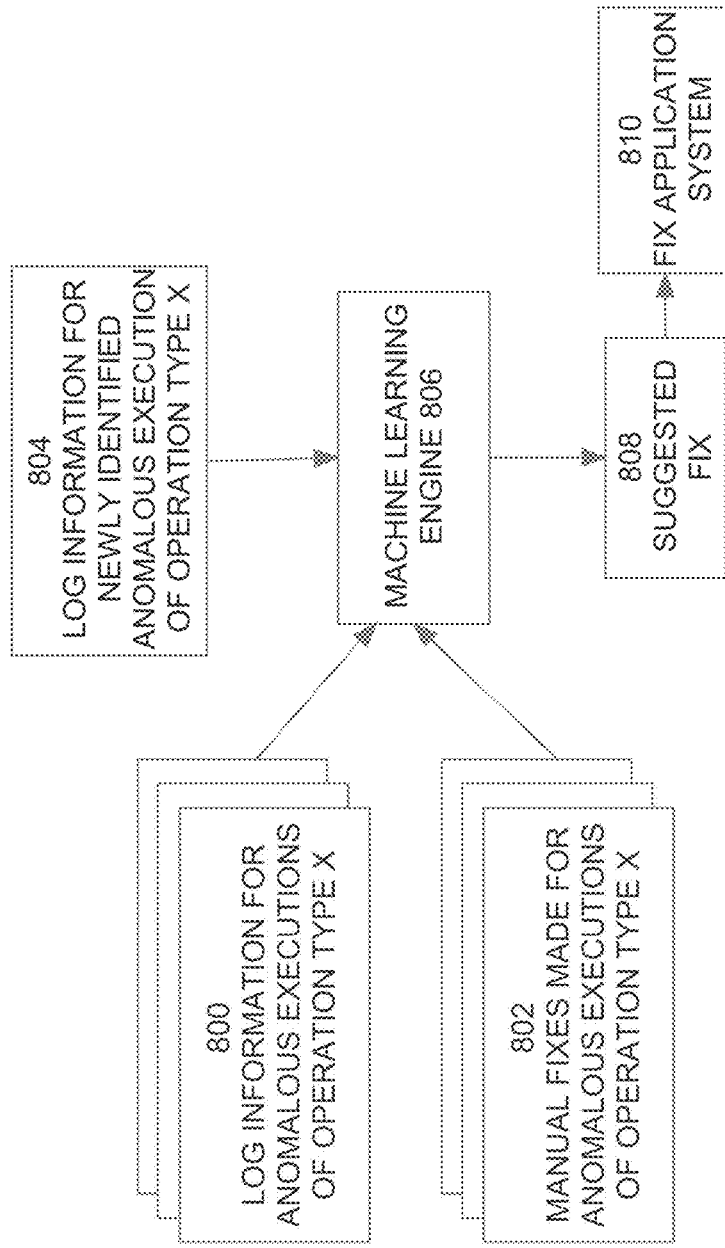
FIG. 8 is a block diagram illustrating an automated fix application system, according to an embodiment.

Referring to FIG. 8, it is a block diagram of a system for automating the generation of suggested fixes. Initially, machine learning engine 806 is trained with log information for prior anomalous executions of a particular type of operation (e.g. operation type X). In conjunction with the log information of the anomalous executions, the machine learning engine 806 is fed the corresponding fixes 802 of each of the anomalous executions. Once trained, the log information for a newly identified anomalous execution may be fed to machine learning engine 806, and machine learning engine 806 generates a suggested fix.

In the illustrated embodiment, the suggested fix is provided to a fix application system 810 that may either present the suggested fix 808 to a user for verification, or automatically apply the fix. In situations where the suggested fix 808 is presented to a user, the user may accept the fix or make modifications to it prior to instructing fix application system 810 to execute the fix. In cases where the user makes changes to the fix prior to applying it, the modified fix, along with the log information for the newly identified anomalous execution, may be fed back into machine learning engine 806 for further training.

Aggregate Root Identifiers

In domain driven design, a separate service is provided for each "domain", and each domain has a highest-level object that it manages. The highest-level object managed by a service is referred to as the aggregate root of the service. For example, the aggregate root of a loan service may be a loan object, while the aggregate root of a person service is a person object. Each instance of an aggregate root will have a unique identifier within its applicable service. Thus, within the loan service, each loan will have a unique identifier. Since "loan" is the aggregate root for the loan service, the unique identifier for a loan is an aggregate root identifier.

In one embodiment, the aggregate root ID associated with each multi-system operation is inserted, as part of the correlation context metadata, into the BIZ-OP table (e.g. MSOT1). As shall be described in greater detail hereafter, the presence of the aggregate root identifier in the event metadata of multi-system operations allows parallelization, and the life-time monitoring of aggregate objects.

Parallelizing the Event Streams

In the embodiments described above, each commit log is read by a single streaming module produces a single event stream. However, to improve performance and take full advantage of multi-processing systems, a single streaming module may generate multiple event streams in parallel, or multiple streaming modules may concurrently generate event streams from the same commit log. According to one embodiment, the only constraint on the parallelization of event stream generation is that events that relate to the same aggregate root be in the same stream and, within the stream, be in the sequence in which the events occurred.

Specifically, if each commit log were mined a single thread, and everything were processed in order, eventually it is not going to scale. Therefore, in one embodiment, when mining a commit log, the commit log is processed in parallel by any number of threads so long as all records associated with any given aggregate root ID are processed in the same thread.

Discovering New Business Operations

In some cases, the operations performed relative to a particular correlation identifier may not be associated with any existing business operation type. That is, there may be event records where the "operation type" attribute is empty.

According to an embodiment, event records that do not have any operation identifier are fed as input to a machine learning engine to identify operations that exhibit similar patterns. Once a set of operations that exhibit the same pattern is identified, a user may determine whether all of those operations represent the same type of high-level business operation. In situations where those operations represent the same type of high-level business operation, a new business operation label may be created for that type of business operation, and the applications that perform that operation may be modified to include that label in the correlation context when performing that type of operation.

Life-Cycle Record-Sets

In the preceding discussions, event records are grouped based on correlation identifier, where all events with the same correlation identifier are known to have been part of the same multi-system operation. Typically, those records will also have the same aggregate root identifier. As mention above, the aggregate root identifier for a given multi-system operation identifies the specific highest-level object, involved in the multi-system operation, of the first service called to initiate the multi-system operation.

For example, to initiate a loan application, a client may make an HTTP call to a loan application service. In response, the loan application service may generate an identifier for the new loan. That identifier will be included in correlation context of all further operations performed as part of the loan application process. In addition, that same loan identifier will be included in the correlation context of all future operations involving that loan, even though those future operations will have different correlation identifiers. For example, during the life-cycle of each loan, the loan may be involved in several operations: loan application, loan funding, loan issuance. For each loan, each of those operations may have its own correlation identifier, but all event records would have the aggregate root identifier of the loan in question. The set of all event records that are associated with a given high-level object is referred to herein as the "life-cycle record-set" of the high-level object.

Discovering Life Cycle Patterns of a High-Level Object

According to one embodiment, a life-cycle analysis system includes a machine learning system that is trained with the life-cycle record-set of multiple instances of the same type of high-level object. For example, assume that a loan system has handled 10 thousand loans from beginning to completion. The life-cycle record-set of each of those 10 thousand loans may be fed to a machine learning engine to cause the machine learning engine to learn the common patterns for the normal life-cycle of a loan.

Once trained to recognize the normal life-cycle of a high-level item, the life-cycle record-set of not-yet-completed items may be fed to the system to detect anomalies in a manner similar to detecting anomalies with individual multi-system operations. For example, if the normal life-cycle pattern of a loan indicates that loans are funded within a certain amount of time of the loan application, the life-cycle analysis system may identify a particular loan as an anomaly if twice that amount of time has occurred and the loan remains unfunded. Thus, the same event data that is used to track multi-system operations can be used to track the larger life-cycle patterns, and then detect anomalous life-cycle situations.

Not only can the detected life-cycle patterns be used to identify anomalous cases, but it may also be used to improve "normal" behavior. For example, it may become apparent from the life-cycle analysis that the normal loan is taking too long at a particular state in the process. Based on the event data, it may be possible to identify exactly where the delay is occurring.

Post-Facto Annotation of Business Operations

In one embodiment, every application will be annotating their API transactions with the appropriate correlation context. Initially, each application may indicate, for example, a business operation tag, and a business operation subtype, and an aggregate root. Unfortunately, legacy applications were not designed to store correlation contexts.

To include legacy data in the training sets used by the machine learning engines, it would be helpful to retroactively add the appropriate annotations to the records of already-executed operations. Specifically, the system finds out the patterns of the database changes, database fields, database changes to and from values, and aggregates the records using the correlation ID.

Based on the patterns, a user may identify what type of database operation was being performed, and cause the legacy data to be annotated accordingly. For example, the machine learning engine may be trained to identify the activity pattern exhibited by a loan application operation. Legacy data operation data may be compared against the pattern to identify the operations that are likely to have been loan applications, but were not annotated as such. The event records for those operations may be annotated to identify the appropriate type and subtype of the operation in question. If the legacy data does not identify an aggregate root, a user can manually annotate the data with appropriate aggregate root ID.

Further, the annotation may be added on-the-fly for data being generated by legacy applications that do not perform the annotation themselves. As an example of on-the-fly annotation, assume that a legacy application X does not inject annotations to reflect the correlation context of the operations it performs. Based on the learned pattern for a known type of business operation, a rule may be: whenever application X performs an operation that changes table X, and field Y, if there is no business operation type identifier associated with the event data, then label this transaction as part of a business operation type X. After such retro-active annotation, the data from the legacy operation can be fed back into the system, causing the streaming modules to producing events that contain the desired contextual information. Thus, for the case of legacy apps that aren't built to automatically annotate their changes, the system monitors what the application is doing and automatically adds the appropriate annotations.

Once an applications records are automatically tagged/annotated, even though the application itself has not changed, the applications events may be used with all of the prediction and anomaly detection techniques that have been described herein.

In an alternative embodiment, rather than automatically annotating a legacy application's output retroactively, modules can be added to the communication channels between the applications to annotate the messages as they pass between systems.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
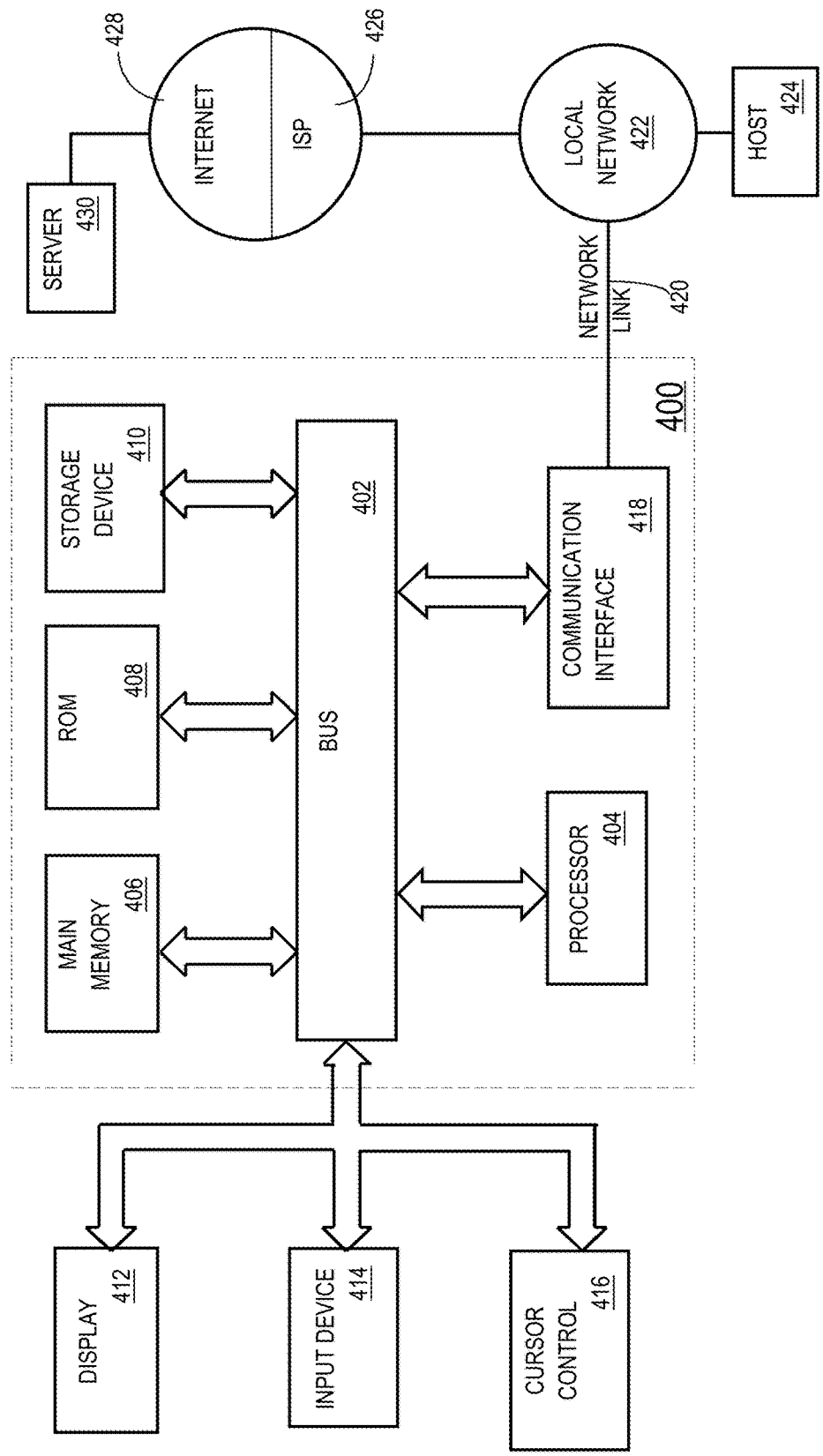
FIG. 4 is a block diagram of a computer system that may be used to implement the technique described herein.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for tracking progress of multi-system operations, comprising:

receiving a request, at a first service application associated with a first service, to initiate a particular operation instance of a particular type of multi-system operation;

wherein the particular type of multi-system operation requires work to be performed by the first service and by one or more second services;

the first service generating a correlation context for the particular operation instance;

wherein the correlation context includes at least a correlation identifier that uniquely identifies the particular operation instance;

as the first service application performs a first portion of the particular operation instance, the first service application dynamically updating the correlation context with additional metadata about the particular operation instance;

causing the first service application to generate a first set of log records that include the correlation context;

providing the correlation context created by the first service application to the one or more second services;

wherein each second service, of the one or more second services, is associated with a respective service application that performs a respective portion of the particular operation instance;

wherein the respective service application of each second service:

dynamically updates the correlation context with additional metadata about the particular operation instance to reflect the respective portion of the particular operation instance that is performed by the respective service application; and generates a respective set of log records that include the correlation context;

wherein, after the dynamic updates made by the respective service application of each second service, the correlation context continues to include the correlation identifier but reflects different metadata about progress of execution of the particular operation instances;

based on the correlation identifier, identifying a plurality of log records associated with the particular operation instance;

wherein the plurality of log records includes (a) one or more log records from the first set of log records and (b) one or more log records from each respective set of log records generated by each respective second service of the one or more second services; and based on the additional metadata associated with the plurality of log records, determining actions, performed as part of the particular operation instance of the particular type of multi-system operation, by (a) the first service application and (b) the respective service application of each second service.

2. The method of claim 1 wherein the additional metadata includes a sequence number that is incremented each time a service involved in the particular operation instance calls another service to perform a portion of the particular operation instance.

3. The method of claim 2 further comprising generating a call graph for the particular operation instance based, at least in part, on sequence numbers in the log records, of the first service application and the respective service applications of the one or more second services, that contain the correlation context of the particular operation instance.

4. The method of claim 3 further comprising comparing the call graph for the particular operation instance to expected call graph features for the particular type of multi-system operation to determine whether the particular operation instance exhibited anomalous behavior.

5. The method of claim 4 further comprising generating the expected call graph features by training a machine learning engine with a training set that includes call graphs of a plurality of previously-executed instances of the particular type of multi-system operation.

6. The method of claim 1 wherein the additional metadata includes data identifying the first service application as the application that was originally requested to initiate the particular operation instance.

7. The method of claim 1 wherein:
a particular call was made during execution of the particular operation instance; and
the additional metadata includes data identifying a particular entity as maker of the particular call.

8. The method of claim 1 wherein:
a particular call was made during execution of the particular operation instance; and
the additional metadata includes data identifying a particular entity as recipient of the particular call.

9. The method of claim 1 wherein the additional metadata includes data identifying the particular type of multi-system operation.

10. The method of claim 1 wherein the additional metadata includes data identifying a particular instance of a highest-level object, at the first service, that is involved in the particular operation instance.

11. The method of claim 1 wherein providing the correlation context created by the first service application to the one or more second services includes passing the correlation context in a call from the first service application to a particular second service of the one or more second services.

12. The method of claim 11 wherein, in response to the call, the particular second service updates the correlation context to include:
information that identifies a first entity that made the call;
information that identifies a second entity that received the call; and
an incremented sequence number.

13. The method of claim 1 wherein providing the correlation context created by the first service application to the one or more second services includes a particular second service, of the one or more second services, obtaining the correlation context from a file that was generated by the first service and imported by the particular second service.

14. The method of claim 1 wherein:
during execution of the particular operation instance, a particular call is made from a particular entity, to a particular second service, on behalf of a particular user that is authorized to use the particular second service; and
the particular second service adds, to the correlation context, data that identifies the particular user authorized to use the particular second service on whose behalf the particular call was made.

15. One or more non-transitory computer-readable media storing instructions for tracking progress of multi-system operations, wherein the instructions include instructions which, when executed by one or more computing devices, cause:
receiving a request, at a first service application associated with a first service, to initiate a particular operation instance of a particular type of multi-system operation;
wherein the particular type of multi-system operation requires work to be performed by the first service and by one or more second services;
the first service generating a correlation context for the particular operation instance;
wherein the correlation context includes at least a correlation identifier that uniquely identifies the particular operation instance;
as the first service application performs a first portion of the particular operation instance, the first service application dynamically updating the correlation context with additional metadata about the particular operation instance;
causing the first service application to generate a first set of log records that include the correlation context;
providing the correlation context created by the first service application to the one or more second services;
wherein each second service, of the one or more second services, is associated with a respective service application that performs a respective portion of the particular operation instance;
wherein the respective service application of each second service:
dynamically updates the correlation context with additional metadata about the particular operation instance to reflect the respective portion of the particular operation instance that is performed by the respective service application; and
generates a respective set of log records that include the correlation context;
wherein, after the dynamic updates made by the respective service application of each second service, the correlation context continues to include the correlation identifier but reflects different metadata about progress of execution of the particular operation instance;
based on the correlation identifier, identifying a plurality of log records associated with the particular operation instance;
wherein the plurality of log records includes (a) one or more log records from the first set of log records and (b) one or more log records from each respective set of log records generated by each respective second service of the one or more second services; and
based on the additional metadata associated with the plurality of log records, determining actions, performed as part of the particular operation instance of the particular type of multi-system operation, by (a) the first service application and (b) the respective service application of each second service.

16. The one or more non-transitory computer-readable media of claim 15 wherein the additional metadata includes a sequence number that is incremented each time a service involved in the particular operation instance calls another service to perform a portion of the particular operation instance.

17. The one or more non-transitory computer-readable media of claim 16, wherein the instructions further include instructions which, when executed by one or more computing devices, cause generating a call graph for the particular operation instance based, at least in part, on sequence numbers in the log records, of the first service application and the respective service applications of the one or more second services, that contain the correlation context of the particular operation instance.

18. The one or more non-transitory computer-readable media of claim 17, wherein the instructions further include instructions which, when executed by one or more computing devices, cause comparing the call graph for the particular operation instance to expected call graph features for the particular type of multi-system operation to determine whether the particular operation instance exhibited anomalous behavior.

19. The one or more non-transitory computer-readable media of claim 18, wherein the instructions further include instructions which, when executed by one or more computing devices, cause generating the expected call graph features by training a machine learning engine with a training set that includes call graphs of a plurality of previously-executed instances of the particular type of multi-system operation.

20. The one or more non-transitory computer-readable media of claim 15 wherein the additional metadata includes data identifying the first service application as the application that was originally requested to initiate the particular operation instance.

21. The one or more non-transitory computer-readable media of claim 15 wherein:
a particular call was made during execution of the particular operation instance; and
the additional metadata includes data identifying a particular entity as maker of the particular call.

22. The one or more non-transitory computer-readable media of claim 15 wherein:
a particular call was made during execution of the particular operation instance; and
the additional metadata includes data identifying a particular entity as recipient of the particular call.

23. The one or more non-transitory computer-readable media of claim 15 wherein the additional metadata includes data identifying the particular type of multi-system operation.

24. The one or more non-transitory computer-readable media of claim 15 wherein the additional metadata includes data identifying a particular instance of a highest-level object, at the first service, that is involved in the particular operation instance.

25. The one or more non-transitory computer-readable media of claim 15 wherein providing the correlation context created by the first service application to the one or more second services includes passing the correlation context in a call from the first service application to a particular second service of the one or more second services.

26. The one or more non-transitory computer-readable media of claim 25, wherein, in response to the call, the particular second service updates the correlation context to include:
information that identifies a first entity that made the call;
information that identifies a second entity that received the call; and
an incremented sequence number.

27. The one or more non-transitory computer-readable media of claim 15 wherein providing the correlation context created by the first service application to the one or more second services includes a particular second service, of the one or more second services, obtaining the correlation context from a file that was generated by the first service and imported by the particular second service.

28. The one or more non-transitory computer-readable media of claim 15, wherein the instructions further include instructions which, when executed by one or more computing devices, cause:
during execution of the particular operation instance, a particular call is made from a particular entity, to a particular second service, on behalf of a particular user that is authorized to use the particular second service; and
the particular second service adds, to the correlation context, data that identifies the particular user authorized to use the particular second service on whose behalf the particular call was made.

* * * * *